(12) United States Patent
Bottom (10) Patent No.: US 8,321,260 B2
(45) Date of Patent: Nov. 27, 2012

(54) PRODUCT ASSORTMENT PLANNING SYSTEM AND METHOD UTILIZING SCALED PERFORMANCE METRIC VALUES

(75) Inventor: Joseph Stuart Bottom, Chico, CA (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/946,327

(22) Filed: Nov. 15, 2010

(65) Prior Publication Data

US 2012/0123814 A1 May 17, 2012

(51) Int. Cl.
*G06Q 10/00* (2006.01)

(52) U.S. Cl. ............ 705/7.29; 705/7.31; 705/7.32; 705/7.33

(58) Field of Classification Search ............. 705/7.29, 705/7.31, 7.32, 7.33
See application file for complete search history.

(56) References Cited

U.S. PATENT DOCUMENTS

| | | | | |
|---|---|---|---|---|
| 6,035,284 A | * | 3/2000 | Straub et al. | 705/28 |
| 7,092,929 B1 | * | 8/2006 | Dvorak et al. | 705/28 |
| 8,082,170 B2 | * | 12/2011 | Cereghini et al. | 705/7.31 |
| 2001/0047293 A1 | | 11/2001 | Waller et al. | |
| 2002/0035537 A1 | * | 3/2002 | Waller et al. | 705/37 |
| 2002/0198759 A1 | * | 12/2002 | Gilday et al. | 705/10 |
| 2003/0195791 A1 | * | 10/2003 | Waller et al. | 705/10 |
| 2005/0114196 A1 | * | 5/2005 | Schoenmeyr | 705/10 |
| 2007/0050235 A1 | * | 3/2007 | Ouimet | 705/10 |
| 2008/0243588 A1 | * | 10/2008 | Connolly | 705/10 |
| 2009/0276289 A1 | * | 11/2009 | Dickinson et al. | 705/10 |
| 2011/0238459 A1 | * | 9/2011 | Bottom | 705/7.29 |

* cited by examiner

*Primary Examiner* — Jason Dunham
*Assistant Examiner* — Jamie Swartz
(74) *Attorney, Agent, or Firm* — Mannava & Kang, P.C.

(57) ABSTRACT

A product assortment planning system determines scaled performance metric values for an assortment of products. The system includes a data store storing performance metric values for an assortment of products including a target assortment of products and a source assortment of products, an equivalization unit and a scaling unit. The equivalization unit equivalizes the performance metric values for the source assortment of products. The scaling unit determines incrementality assumptions. The incrementality assumptions are an estimation of an amount of cannibalization that occurs for the target assortment of products as a result of combining the source assortment of products with the target assortment of products. Scaled performance metric values are calculated for each product in the assortment of products based on the equivalized performance metric values and the incrementality assumptions.

7 Claims, 9 Drawing Sheets

| Product | Column A | Column B | Column C | Column D | Column E | Column F | Column G | Column H |
|---|---|---|---|---|---|---|---|---|
| 1 | Target | 100 | 107.4 | 100 | 100 | 84.65 | 26.77% | 26.77% |
| 2 | Source | 0 | 74.75 | 65 | 165 | 139.68 | 17.40% | 44.17% |
| 3 | Target | 48.75 | 60 | 48.75 | 213.75 | 180.95 | 13.05% | 57.22% |
| 4 | Target | 36.5265 | 0 | 36.5265 | 250.3125 | 211.90 | 9.79% | 67.01 |
| 5 | Target | 27.421875 | 40 | 27.421875 | 277.7344 | 235.11 | 7.34% | 74.35 |
| 6 | Target | 20.55640625 | 0 | 20.55640625 | 298.3008 | 252.52 | 5.51% | 79.85 |
| 7 | Target | 15.42480469 | 20 | 15.42480469 | 313.7256 | 265.58 | 4.13% | 83.98 |
| 8 | Source | 0 | 13.30 | 11.5686035 | 325.2942 | 275.37 | 3.10% | 87.08 |
| 9 | Target | 8.676452637 | 5 | 8.676452637 | 333.9706 | 282.72 | 2.32% | 89.40 |
| 10 | Target | 6.507339478 | 0 | 6.507339478 | 340.478 | 288.32 | 1.74% | 91.14 |
| 11 | Target | 5.531238556 | 3 | 5.531238556 | 346.0092 | 292.91 | 1.48% | 92.62 |
| 12 | Target | 4.701552773 | 4 | 4.701552773 | 350.7108 | 296.89 | 1.26% | 93.88 |
| 13 | Target | 3.996319857 | 2 | 3.996319857 | 354.7071 | 300.27 | 1.07% | 94.95 |
| 14 | Target | 3.396871878 | 3 | 3.396871878 | 358.104 | 303.15 | 0.91% | 95.86 |
| 15 | Target | 2.887341096 | 0 | 2.887341096 | 360.9913 | 305.59 | 0.77% | 96.63 |
| 16 | Source | 0 | 2.822 | 2.45423993 | 363.4455 | 307.67 | 0.66% | 97.29 |
| 17 | Target | 2.086103942 | 0 | 2.086103942 | 365.5316 | 309.44 | 0.56% | 97.85 |
| 18 | Target | 1.773188351 | 0 | 1.773188351 | 367.3048 | 310.94 | 0.47% | 98.32 |
| 19 | Source | 0 | 1.733 | 1.5072101 | 368.812 | 312.21 | 0.40% | 98.73 |
| 20 | Target | 1.281128583 | 0 | 1.281128583 | 370.0932 | 313.30 | 0.34% | 99.07 |
| 21 | Target | 1.088959296 | 0 | 1.088959296 | 371.1821 | 314.22 | 0.29% | 99.36 |
| 22 | Target | 0.925615402 | 0 | 0.925615402 | 372.1078 | 315.00 | 0.25% | 99.61 |
| 23 | Target | 0.786773091 | 0 | 0.786773091 | 372.8945 | 315.67 | 0.21% | 99.82 |
| 24 | Target | 0.668757128 | 0 | 0.668757128 | 373.5633 | 316.23 | 0.18% | 100.00 |

FIG. 3a

| Product | Column A | Column I | Column J | Column K | Column L | Column M |
|---|---|---|---|---|---|---|
| 1 | Target | 0.00% | 0.00% | 0.00 | 84.65 | 84.65 |
| 2 | Source | 44.17% | 67.67% | 43.98 | 55.02 | 139.68 |
| 3 | Target | 0.00% | 0.00% | 0.00 | 41.27 | 180.95 |
| 4 | Target | 0.00% | 0.00% | 0.00 | 30.95 | 211.90 |
| 5 | Target | 0.00% | 0.00% | 0.00 | 23.21 | 235.11 |
| 6 | Target | 0.00% | 0.00% | 0.00 | 17.41 | 252.52 |
| 7 | Target | 0.00% | 0.00% | 0.00 | 13.06 | 265.58 |
| 8 | Source | 87.08% | 84.8% | 9.91 | 9.79 | 275.37 |
| 9 | Target | 0.00% | 0.00% | 0.00 | 7.34 | 282.72 |
| 10 | Target | 0.00% | 0.00% | 0.00 | 5.51 | 288.32 |
| 11 | Target | 0.00% | 0.00% | 0.00 | 4.68 | 292.91 |
| 12 | Target | 0.00% | 0.00% | 0.00 | 3.98 | 296.89 |
| 13 | Target | 0.00% | 0.00% | 0.00 | 3.38 | 300.27 |
| 14 | Target | 0.00% | 0.00% | 0.00 | 2.88 | 303.15 |
| 15 | Target | 0.00% | 0.00% | 0.00 | 2.44 | 305.59 |
| 16 | Source | 97.29% | 88.90% | 2.18 | 2.08 | 307.67 |
| 17 | Target | 0.00% | 0.00% | 0.00 | 1.77 | 309.44 |
| 18 | Target | 0.00% | 0.00% | 0.00 | 1.50 | 310.94 |
| 19 | Source | 98.73% | 89.50% | 1.35 | 1.28 | 312.21 |
| 20 | Target | 0.00% | 0.00% | 0.00 | 1.08 | 313.30 |
| 21 | Target | 0.00% | 0.00% | 0.00 | 0.92 | 314.22 |
| 22 | Target | 0.00% | 0.00% | 0.00 | 0.78 | 315.00 |
| 23 | Target | 0.00% | 0.00% | 0.00 | 0.67 | 315.67 |
| 24 | Target | 0.00% | 0.00% | 0.00 | 0.57 | 316.23 |
|  |  |  |  | 57.42 |  |  |

Fig. 3b

| Product | Column A | Column O | Column P | Column Q | Column R | Column S | Column T | Column U |
|---|---|---|---|---|---|---|---|---|
| 1 | Target | 0.00 | 36.77 | 36.98% | 13.594 | 302.640 | 91.67 | 91.67 |
| 2 | Source | 0.00 | 36.77 | 36.98% | 13.594 | 302.640 | 151.26 | 59.59 |
| 3 | Target | 0.00 | 36.77 | 36.98% | 13.594 | 302.640 | 195.95 | 44.69 |
| 4 | Target | 0.00 | 36.77 | 36.98% | 13.594 | 302.640 | 229.47 | 33.52 |
| 5 | Target | 23.22 | 36.77 | 36.98% | 13.594 | 302.640 | 229.47 | 0.00 |
| 6 | Target | 0.00 | 13.55 | 32.57% | 4.414 | 311.821 | 248.32 | 18.85 |
| 7 | Target | 0.00 | 13.55 | 32.57% | 4.414 | 311.821 | 262.46 | 14.14 |
| 8 | Source | 0.00 | 13.55 | 32.57% | 4.414 | 311.821 | 273.07 | 10.61 |
| 9 | Target | 0.00 | 13.55 | 32.57% | 4.414 | 311.821 | 281.02 | 7.95 |
| 10 | Target | 0.00 | 13.55 | 32.57% | 4.414 | 311.821 | 286.99 | 5.97 |
| 11 | Target | 4.68 | 13.55 | 32.57% | 4.414 | 311.821 | 286.99 | 0.00 |
| 12 | Target | 0.00 | 8.87 | 31.68% | 2.810 | 313.424 | 291.30 | 4.31 |
| 13 | Target | 3.38 | 8.87 | 31.68% | 2.810 | 313.424 | 291.30 | 0.00 |
| 14 | Target | 0.00 | 5.49 | 31.04% | 1.703 | 314.531 | 294.41 | 3.11 |
| 15 | Target | 2.45 | 5.49 | 31.04% | 1.703 | 314.531 | 294.41 | 0.00 |
| 16 | Source | 0.00 | 3.04 | 30.58% | 0.930 | 315.304 | 296.66 | 2.25 |
| 17 | Target | 1.76 | 3.04 | 30.58% | 0.930 | 315.304 | 296.66 | 0.00 |
| 18 | Target | 0.00 | 1.28 | 30.24% | 0.386 | 315.849 | 298.28 | 1.63 |
| 19 | Source | 1.28 | 1.28 | 30.24% | 0.386 | 315.849 | 298.28 | 0.00 |
| 20 | Target | 0.00 | 0.00 | 30.00% | 0.00 | 316.234 | 299.46 | 1.17 |
| 21 | Target | 0.00 | 0.00 | 30.00% | 0.00 | 316.234 | 300.46 | 1.00 |
| 22 | Target | 0.00 | 0.00 | 30.00% | 0.00 | 316.234 | 301.31 | 0.85 |
| 23 | Target | 0.00 | 0.00 | 30.00% | 0.00 | 316.234 | 302.03 | 0.72 |
| 24 | Target | 0.00 | 0.00 | 30.00% | 0.00 | 316.234 | 302.64 | 0.61 |

PRODUCT ASSORTMENT PLANNING SYSTEM AND METHOD UTILIZING SCALED PERFORMANCE METRIC VALUES

BACKGROUND

Retailers generally attempt to maximize profits or other performance metrics such as sales volume through different types of retail strategies. In order to keep current customers and gain additional customers, retailers invest in retail strategies to provide an appealing arrangement of products on display. For example, retail assortment planning is a strategy used to specify a set or an assortment of products carried by a retailer that meets the customers' product preferences. Retail assortment planning may encompass selecting an assortment of products to offer for sale that would maximize a selected performance metric. Retailers may also attempt to display an assortment of products on shelving and display units that meets customers' unique behaviors, needs and expectations. The shelves and display units may be arranged in aisles and have various configurations and dimensions. Thus, retail assortment planning may encompass determining configurations of available shelf space that would maximize the use of the available shelf space.

However, despite engaging in retail assortment planning, retailers regularly lose volume and profits on unpopular products. This is because of the difficulty in determining how a deletion or an addition of a product or a multitude of products affects an overall performance metric, such as profits or sales volume, of an assortment of products. For example, retailers either assume all sales volume is lost when a product is deleted from an assortment of products or estimate how much sales volume may be lost when a product is deleted from the assortment of products based on the importance of the products. However, with both of these methods, it is difficult to determine which assortment of products is best for the store because the assumption that all sales volume is lost and the estimation of lost sales volume based on the importance of the products may be inaccurate.

SUMMARY

According to an embodiment, a product assortment planning system determines scaled performance metric values for an assortment of products. The system includes a data store storing performance metric values for an assortment of products including a target assortment of products and a source assortment of products, an equivalization unit and a scaling unit. The equivalization unit equivalizes the performance metric values for the source assortment of products. The scaling unit determines incrementality assumptions. The incrementality assumptions are an estimation of an amount of cannibalization that occurs for the target assortment of products as a result of combining the source assortment of products with the target assortment of products. Scaled performance metric values are calculated for each product in the assortment of products based on the equivalized performance metric values and the incrementality assumptions.

According to an embodiment, a method for product assortment planning includes receiving a target assortment of products and a source assortment of products; determining performance metric values for each product in the target assortment of products and the source assortment of products; equivalizing the performance metric values; determining incrementality assumptions, wherein the incrementality assumptions are an estimation of an amount of cannibalization that occurs for the target assortment of products as a result of combining the source assortment of products with the target assortment of products; and calculating, by a computer, scaled performance metric values for each product in the target assortment of products and the source assortment of products based on the equivalized performance metric values and the incrementality assumptions.

A computer readable medium stores machine readable instructions that may be executed by a computer to perform the method for product assortment planning. The computer readable medium may be non-transitory and may include one or more computer readable mediums storing instructions that are executed by one or more computers.

BRIEF DESCRIPTION OF DRAWINGS

The embodiments of the invention will be described in detail in the following description with reference to the following figures.

FIG. 3a illustrates an example of calculated performance metric values, according to an embodiment;

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Also, the embodiments described herein may be used with each other in various combinations.

1. Overview

According to an embodiment, a product assortment planning system estimates the results from any combination of additions or deletions to a set of products offered for sale (i.e., assortment of products) at a target retail store. The estimations may be used to determine an optimal assortment of products to offer for sale for the target retail store to maximize a performance metric. Note that a store as used herein can be any entity selling goods or services. This may include an online retailer, a brick and mortar retailer or any other entity. Also, products may be goods or services. The target retail store may include a store whose assortment of products is currently being modeled to determine an assortment of products that maximizes the performance metric. The performance metric may be sales volume and/or profits. Of course, other performance metrics instead of sales volume and/or profits may be utilized to determine the optimal assortment of products, including gross margin, adjusted gross margin, contribution margin, consumer loyalty, etc., or a combination of such metrics. Also, the performance metric may be a combined performance metric calculated from two or more metrics, such as sales volume and profits. Also, a store may represent multiple stores. For example, a source store, described below, may include multiple stores from which products are being included in a target store, which may include one or more stores. Also, according to an embodiment, the modeling and calculations described below are applied to a transferable demand group of products, which is a group of products in which demand is believed to be transferable. This may include a group of products in the same segment. For example, children's vitamins, single-slice-wrapped cheeses, adult dandruff shampoo, etc.

According to an embodiment, the system calculates an optimum product deletion order by testing the deletion of each product. This may include evaluating the net change in the total performance metric for the product assortment given one or more deletions. The deletion order may be used to determine the optimal assortment of products for the target retail store to maximize the performance metric.

2. System

Figure 1:
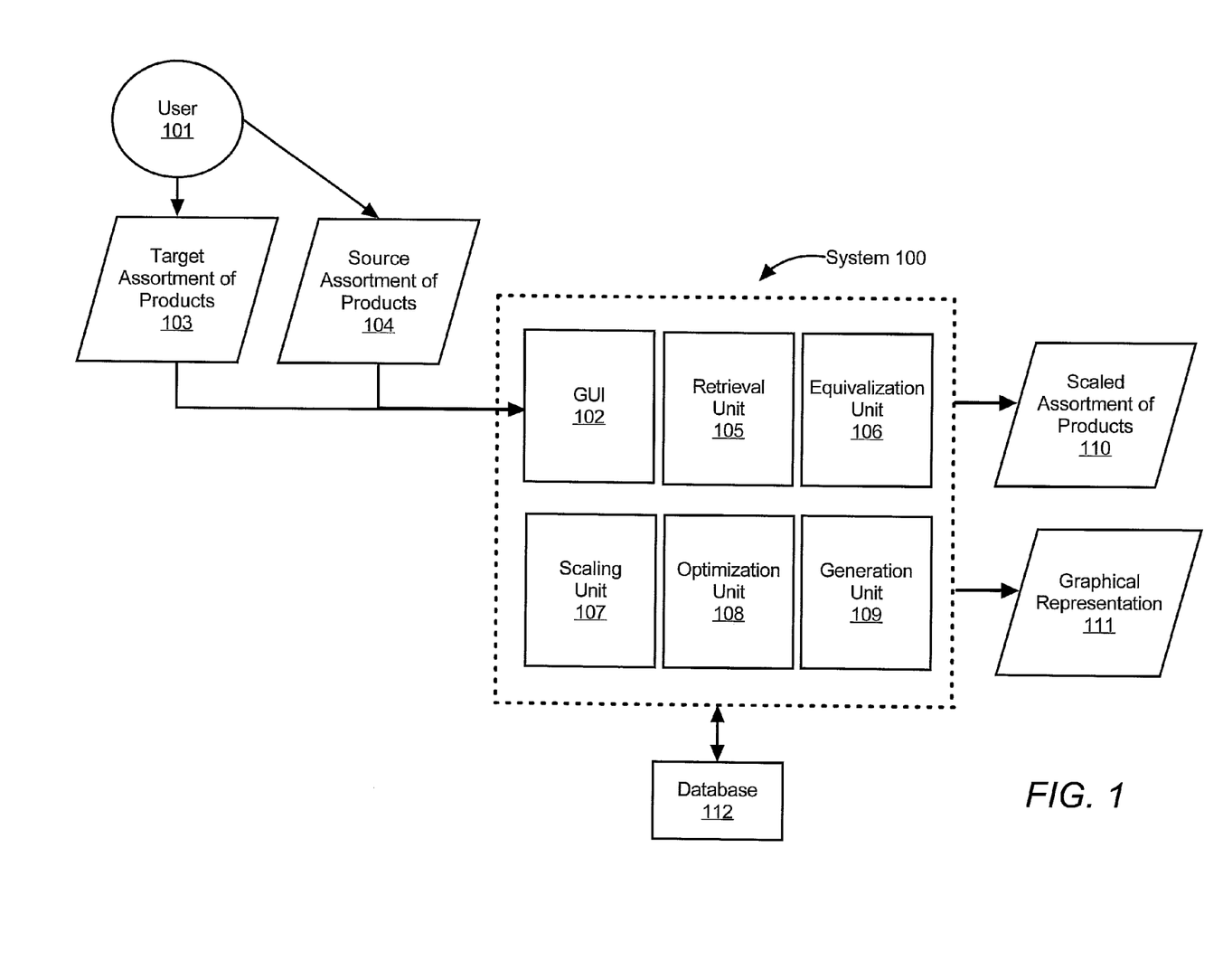
FIG. 1 illustrates a system for product assortment planning, according to an embodiment.

FIG. 1 illustrates a product assortment planning system 100, according to an embodiment. The system 100 includes a graphical user interface (GUI) 102, a retrieval unit 105, an equivalization unit 106, a scaling unit 107, an optimization unit 108 and a generation unit 109. A user 101 may interact with the system 100 as further described below.

The user 101 may access the GUI 102 to enter a target assortment of products 103 and a source assortment of products 104 into the system 100. The target assortment of products 103 includes products carried in a target retail store or other target entity. The target retail store may be a store whose assortment of products is currently being modeled by the system 100. The target retail store may want to include products not currently carried by the target retail store. The source assortment of products 104 includes products not currently carried in the target retail store. The system 100 may model an addition of the source assortment of products 104 to the target assortment of products 103.

The user 101 may enter the target assortment of products 103 and the source assortment of products 104 into the system 100 by entering a unique product identifier into the GUI 102 for each product, such as a stock keeping unit (SKU). The target assortment of products 103 and the source assortment of products 104 may each contain one or more products. According to an embodiment, instead of a user entering the target assortment of products 103 and the source assortment of products 104, the target assortment of products 103 and the source assortment of products 104 may be automatically retrieved by the system 100 from a data store, such as database 112 or another data storage unit that is internal or external to the system 100, or copied by the user from a spreadsheet or other source.

The retrieval unit 105 retrieves a value of a performance metric for each product in the target assortment of products 103. The values of the performance metric for the products in the target assortment of products 103 are based on modeling historical performance metric data from the target retail store. The values of the performance metric for the products in the target assortment of products 103 may be retrieved from the database 112. For example, the performance metric may be sales volume. A sales volume value for each of the products in the target assortment of products 103 may be retrieved. Of course, other performance metrics instead of sales volume and/or profits may be utilized, including gross margin, adjusted gross margin, contribution margin, consumer loyalty, or a combination of such performance metrics.

The retrieval unit 105 retrieves a value of the performance metric for each product in the source assortment of products 104 as well. Because the products in the source assortment of products 104 are not currently carried in the target retail store, the sales volume values or other performance metric values may not be retrieved from the target retail store. The retrieval unit 105 therefore retrieves historical sales volume data from a source retail store or other source entity. A source retail store is a retail store or multiple retail stores that carry at least one of the products from the source assortment of products 104.

The equivalization unit 106 equivalizes the retrieved sales volume values for the products in the source assortment of products 104. Equivalization may be a process of estimating a product's sales volume in a target retail store based on the product's sales volume in a source retail store. For example, store A may be a larger store than store B and thus the sales volume of a segment being modeled may be larger in store A than store B by 30%. If a product carried in store A but not carried in store B is modeled in store B, the equivalized estimate of sales volume may be based on the ratio of total sales volumes of store A and store B, i.e. 30%. Thus, to obtain the equivalized estimate of sales volume for the product being modeled in store B, the sales volume of the product in store A is divided by 1.3.

The equivalization unit 106 also retrieves the sales volume values for the target assortment of products 103. The sales volume values for the target assortment of products 103 are treated as already having been equivalized since the sales volume values already represent a share of the segment in the target retail store. According to an embodiment, the sales volume values for the target assortment of products 103 and the source assortment of products 104 may also be received from an external system and/or may already be equivalized.

The equivalization unit 106 may plot the equivalized sales volume values of the products in the target assortment of products 103 and the source assortment of products 104 as a base volume curve on a graphical representation 111, described in more detail below.

After the base volume curve is plotted on the graphical representation 111 by the equivalization unit 106, the scaling unit 107 determines incrementalities of the products in the target assortment of products 103 and the source assortment of products 104 as a result of the addition of the products in the source assortment of products 104 to the target assortment of products 103, resulting in a scaled assortment of products 110. The incrementalities represent an incremental increase in sales volume values of each product as a result of the addition of products to an existing assortment of products. An incrementality is a net change. Note that the net change takes into consideration cannibalization of sales volume which means that some of the sales volume of a newly added product may be taken from sales volume of an existing product. The scaling unit 107 calculates a scaled sales volume value for each product in the scaled assortment of products 110 that reflects the determined incrementality for each product, as described in more detail below.

The scaling unit 107 may plot the scaled sales volume values of the products in the scaled assortment of products 110 as a scaled volume curve on the graphical representation 111, described in more detail below.

The optimization unit 108 determines optimum incremental sales upon deletion for each product and a change in total segment sales volume between deletions, as further described below. The optimization unit 108 estimates the results from any combination of additions or deletions to an assortment of products at a target retail store. The estimations may be used to determine an optimal assortment of products for the target retail store to maximize a performance metric. Also, the optimization unit 108 may calculate an optimum product deletion order by testing the deletion of each product.

The generation unit 109 may plot the change in total segment sales volume between deletions of the products in the scaled assortment of products 110 as an optimum incremental volume curve on the graphical representation 111, described in more detail below.

3. Examples

Figure 2:
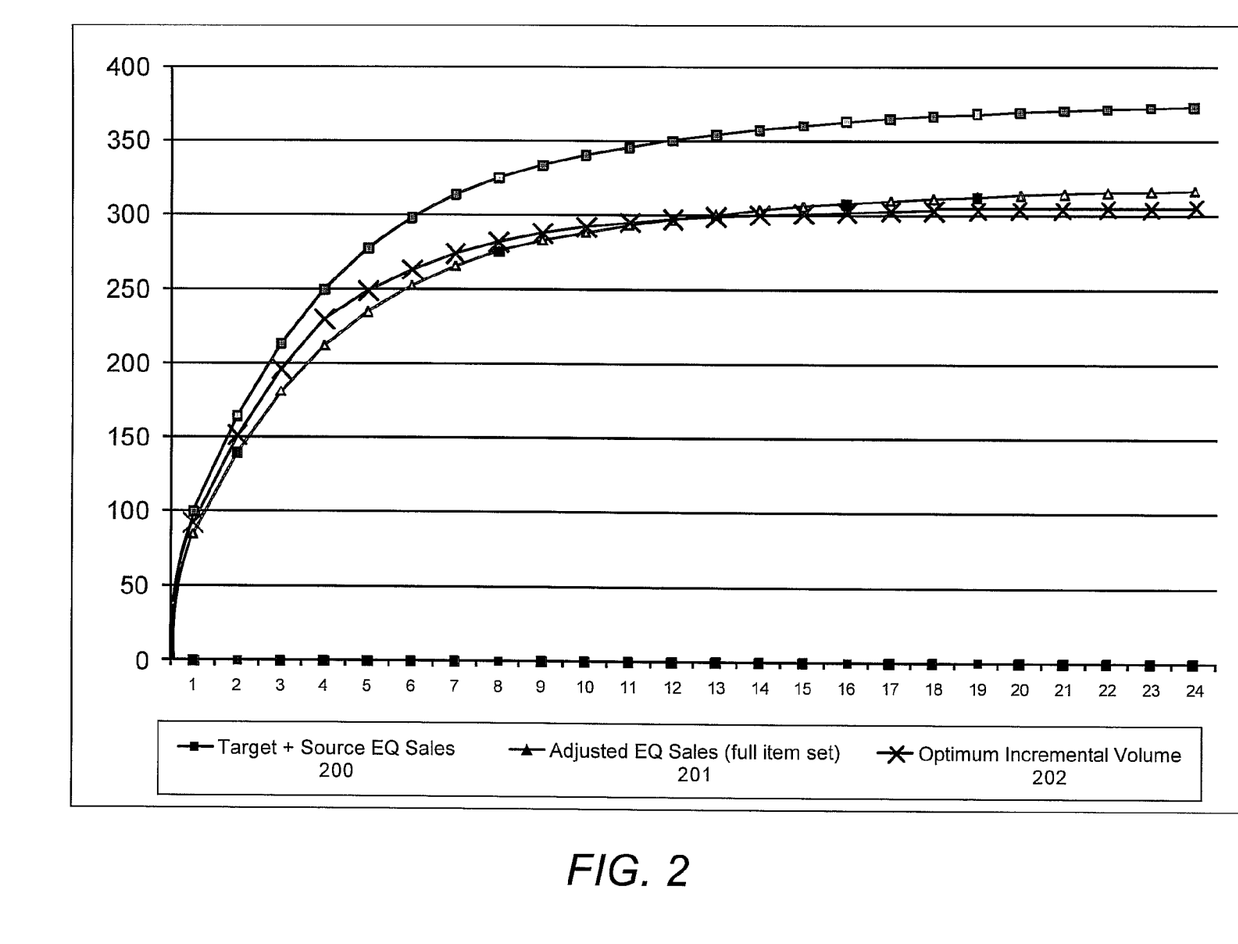
FIG. 2 illustrates a graphical representation, according to an embodiment.

FIG. 2 illustrates an example of the graphical representation 111. The graphical representation 111 illustrates a base volume curve 200, a scaled volume curve 201 and an optimum incremental volume curve 202. The graphical representation 111 in FIG. 2 enables a retailer to determine and visualize a net effect on sales volume or another performance metric as a result of deleting products from the scaled assortment of products 110. The calculations performed by the system 100 to generate the base volume curve 200, the scaled volume curve 201 and the optimum incremental volume curve 202 on the graphical representation 111 are described below with reference to FIGS. 3a-3b.

Figure 3B:
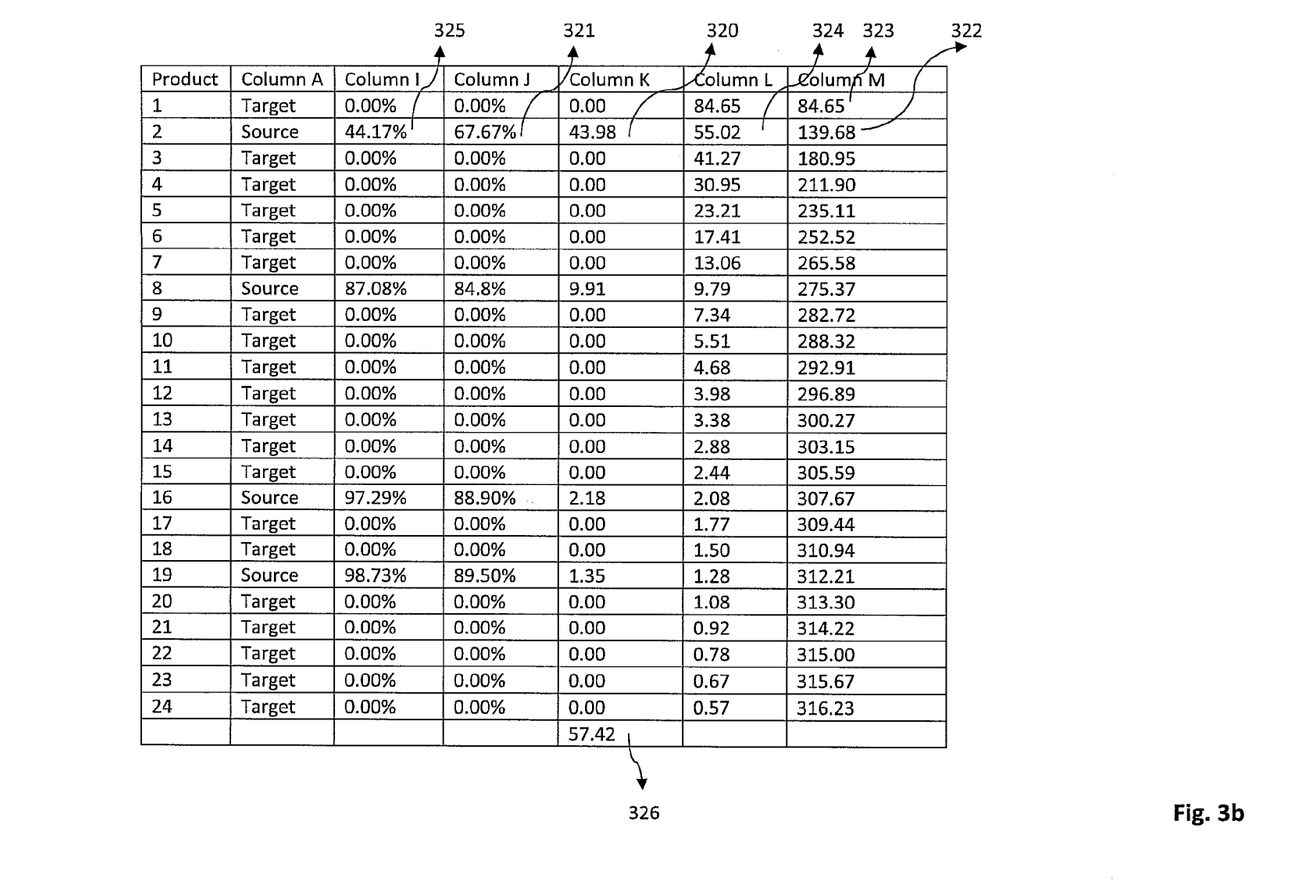
FIG. 3b illustrates an additional example of calculated performance metric values, according to an embodiment.

FIGS. 3a and 3b illustrate calculations performed by the system 100. Column A of FIG. 3a shows which products out of products 1-24 are in the target assortment of products 103 and which products out of the products 1-24 are in the source assortment of products 104. In this example, "Source" in the FIG. 3a, column A, represents products that are only found in the source assortment 104, and not in the target assortment 103. "Target" means the product is found in the target assortment 103, and may or may not be found in the source assortment 104. For example, in FIG. 3a, products 1, 3-7, 9-15, 17, 18 and 20-24 are products in the target assortment of products 103; products 2, 8, 16 and 19 are products only in the source assortment of products 104; and products 1, 3, 5, 7, 9 and 11-14 are in both the target assortment 103 and the source assortment 104.

As discussed above, the system 100 retrieves a value of a performance metric for each product in the target assortment of products 103. The retrieved performance metric values, sales volume values in this case, of the products 1-24 labeled "target" are shown in column B.

Also as discussed above, the system 100 retrieves a value of the performance metric for each product in the source assortment of products 104 as well. The retrieved performance metric values, sales volume values in this case, of the products 1-24 labeled "source" are shown in column C.

The system 100 equivalizes the retrieved sales volumes for the products in the source assortment of products 104, i.e. the products with non-zero values in column C. Equivalization, as discussed above, may be a process of estimating a product's sales volume in a target retail store based on the product's sales volume in a source retail store. For example, the equivalization step may include calculating a ratio of the total sales for source assortment 104 to the total sales for the target assortment 103. For example, assume the ratio is 1.15. Then, for the products found only in the source assortment 104 and not in the target assortment 103, divide the source product's sales by this ratio of 1.15 to determine the equivalized sales volume. Column C shows volumes for source products 2, 8, 16 and 19. These volumes are equalized by dividing by 1.15 to determine the corresponding equivalized volumes shown in column D. The equivalized sales volume values for the products in the target assortment of products 103 and the equivalized sales volume values for the products in the source assortment of products 104 are both shown in column D.

In FIG. 3a, column E represents cumulative equivalized sales volume values for the products in the target assortment of products 103 and the source assortment of products 104. The cumulative equivalized sales volume values for the products 1-24 are obtained by adding the cumulative equalized sales volume value from the preceding product to the equivalized sales volume for the current product. For example, the value of item 300 in FIG. 3a for product 23, 372.8945, is the result of adding the value of item 301 for product 22, the cumulative equivalized sales volume value from the preceding product 22, 372.1078, to the value of item 302, the current equivalized sales volume value 0.786773091, for product 23.

The cumulative equivalized sales volumes as shown in column E of FIG. 3a correspond to the values plotted on the graphical representation 111 in FIG. 2 for the base volume curve 200.

The system 100 then determines the incrementalities of the products in the target assortment of products 103 and the source assortment of products 104 as a result of the addition of the products in the source assortment of products 104 to the target assortment of products 103, resulting in a scaled assortment of products 110. The incrementalities represent incremental increases in sales volume values as a result of the addition of products to an existing assortment of products. Incrementality is based on the notion that the sales volume of each of the products in the existing assortment of products (i.e. target products) may be cannibalized by adding the product from the source assortment of products 104. Thus, the system 100 calculates a scaled sales volume value for each product in the scaled assortment of products 110 as shown in column F. To arrive at the scaled sales volume values in column F, the calculations shown in columns G to L in FIGS. 3a and 3b are performed. For ease, the values of column F are repeated for column M.

Column G illustrates each products' percentage of total unscaled equivalized sales volume and is calculated based on the equivalized sales volume values in column D that represent a product's share of the equivalized sales volume. To obtain a percentage of the total unscaled equivalized sales volume for a product, the equivalized sales volume for the product from column D is divided by the total unscaled equivalized sales volume which is the sum of all the equivalized sales volume values in column D. The sum of all the equivalized sales volume values in column D is 373.563282, shown as item 308. The value of item 303 for product 2, 17.40%, is product 2's percentage of the total unscaled equivalized sales volume. Item 303 is the result of dividing the value for item 304 for product 2, the equivalized sales volume from column D, 65, by the total unscaled equivalized sales volume of item 308, 373.563282.

Column H of FIG. 3a represents each products' cumulative percentage of the total unscaled equivalized sales volume. The values for the products in column H are obtained by adding the cumulative sales volume from the preceding product to the current products' percentage of the total unscaled equivalized sales volume for the current product. For example, the value of item 305 in FIG. 3a for product 3, 57.22%, is the result of adding the value of item 306 for product 2, products 2's cumulative percentage of the total unscaled equivalized sales volume, 44.17%, to the value of item 303, products 2's percentage of the total unscaled equivalized sales volume 13.05%.

In FIG. 3b, the product numbers and column A have been repeated. Column I in FIG. 3b shows, for the added products, i.e. the products in the source assortment of products 104, the cumulative share for equivalized sales volume. The values in column I are simply copied from column H for the products in the source assortments of products 104.

Column J shows, for the added products, i.e. the products in the source assortment of products 104, how much of the added products' equivalized sales volume is not incremental when the product is added to the target assortment of products 103. The values of column J are determined based on two inputs used for additions to the target assortment of products 103. The two inputs, incrementality of addition at the tail and incrementality of addition at the head, control the downward scaling of the base volume curve 200. These parameters represent incrementality assumptions for products added from the source assortment of products 104, and these assumptions may be based on expert analysis. For example, entering 100% for both parameters leaves the scaled volume curve 201 the same as the base volume curve 200 since the scaled volume curve 201 would assume a 100% incrementality on add. In other words, entering 100% assumes there is no cannibalization of sales from existing products. Entering 0% for both yields no change in segment sales volume since the scaled volume curve 201 would assume a 0% incrementality on add. In other words, entering 0% assumes that 100% of the sales for any newly added products will be cannibalized from existing products.

In most cases, an assumption of 0% or 100% for both input parameters is unrealistic. Therefore, a more reasonable assumption for these parameters may be a 10% incrementality of addition at the tail and a 50% incrementality of addition at the head. Thus, more incrementality is given to the higher sales volume added products. In this example, there is a 40% sliding scale, from 50% to 10%. Item 325, the cumulative share for equivalized sales volume, is 44.17%, and is multiplied by 40%, the sliding scale. The result is 17.668% (not shown). This value is subtracted from the 50% value, i.e. the incrementality of addition at the head, which results in a value of 32.332%. Finally, this value is subtracted from 1.00 to arrive at how much of the added products' equivalized sales volume is not incremental when the product is added to the target assortment of products 103, i.e. item 321 in column J.

Column K represents the non-incremental portion of each added product's sales volume value, i.e. the amount of sales volume that is cannibalized. The values in column K are determined by multiplying the values from column J by the values of column D. For example, the value of item 320 in FIG. 3b for product 2, 43.98, is the result of multiplying the value of item 321 for product 2, 67.67%, by the value of item 304 in FIG. 3a for product 2, 65. The total sales volume that is cannibalized is item 326, 57.42.

Column L represents a product's equivalized sales net of the cannibalization effect from the added products from the source assortment of products 103. The sales volume values in column L are determined based on multiplying the values from column G by the total sales volume that is cannibalized, i.e. item 326. This value is then subtracted from the equivalized sales volume values in column D. For example, item 324, 55.02, is a result of multiplying item 326, 57.42, by item 327, 17.40%. This value is then subtracted from item 304, the equivalized sales volume value for the product in column D, 65.

The values for the products in column M are obtained by adding the sales volume value from the preceding product to the current product's equivalized sales net of the cannibalization effect from column L. For example, the value of item 322 in FIG. 3b for product 2, 139.68, is the result of adding the value of item 323 for product 1, 84.65, to the value of item 324 for product 2, 55.02.

The items in column M are the scaled sales volume values for the scaled assortment of products 110 and are plotted as the scaled volume curve 201 in the graphical representation 111 shown in FIG. 2.

Figure 4:
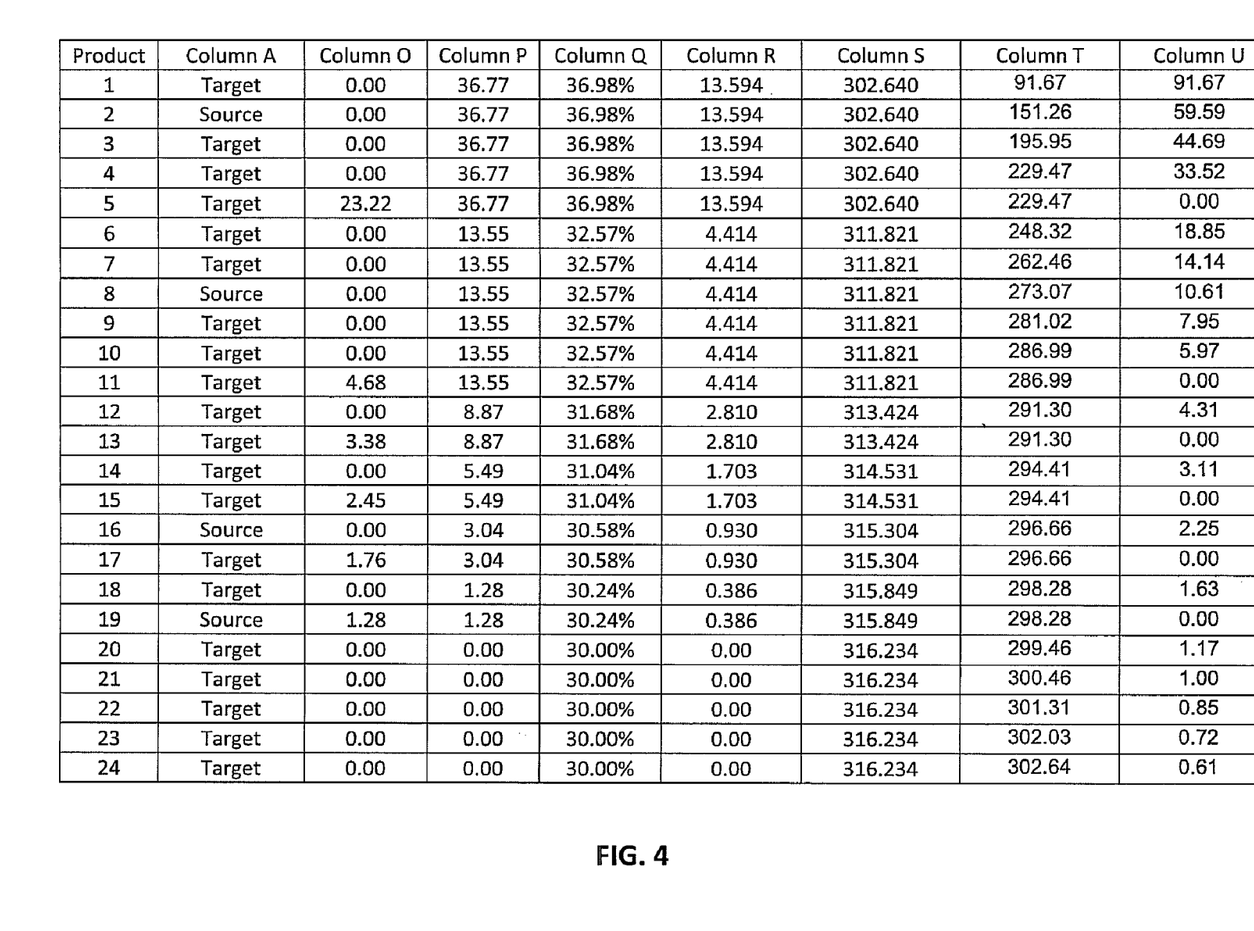
FIG. 4 illustrates an example of calculated performance metric values based on deletions of products, according to an embodiment.

As described above, the optimization unit 108 estimates the results from any combination of additions or deletions to an assortment of products at a target retail store. FIG. 4 shows an example of estimating the results of simultaneously deleting products from an assortment of products comprising all the source and target products. In particular, the estimation shown in FIG. 4 is an incrementality estimation for multiple simultaneous deletions of products from the scaled assortment of products 110. In FIG. 4, the product numbers and column A have been repeated from FIG. 3a.

In FIG. 4, Column O shows scaled sales volumes for the deleted products. The values in column O are "0.00" if the corresponding product is not being deleted from the scaled assortment of products 110. In this example, only products 5, 11, 13, 15, 17, and 19 are being simultaneously deleted.

Column P shows cumulative scaled sales volume for the deleted products, starting from the tail of the curve, which in the example is product 24. The values for the products in column P are obtained by adding the cumulative base sales volume from the preceding product (starting at the tail of the curve, product 24) to the current product's total base sales volume. For example, 3.04 in row 17 is calculated by adding 1.28 and 1.76.

Column Q shows cumulative incrementality percentages (again starting at the tail of the curve, product 24) based on the share of equivalized sales volume represented by the deleted products. This calculation is based on two inputs, incrementality of deletion at the head and incrementality of deletion at the tail. For example, in this case the incrementality of deletion at the head is 90% and the incrementality of deletion at the tail is 30%. In this case, there is a 60% sliding scale, from 90% to 30%.

Column R shows the cumulative incremental sales volume from the deletions starting from the tail of the curve. This cumulative incremental sales from the deletions is the incrementality percentage (starting at the bottom) multiplied by the equivalized sales volume for the deleted products. For example, 0.930 in row 17 of column R is determined by multiplying 3.04 by 0.3058 (30.58%). The two inputs for incrementality of deletion at the head and tail, and therefore, the values in columns Q and R, may either be inputs or values determined from assumptions derived through expert analysis.

Column S shows the total segment sales volume after each of the 6, deletions are done, starting at the tail of the curve (product 24) with the initial segment sales before the first deletion. Column T shows the cumulative recaptured sales volume from the deletions. The highest value in column T is the amount to be spread prorata on sales to the remaining products in the segment, based on each remaining product's share of the base sales for all remaining products, and added to each remaining product's equivalized sales (column L in FIG. 3b). Column U shows the final sales after the deletions, and after applying the cumulative recaptured sales volume from the deletions pro-rata to each of the remaining products.

4. Methods

Figure 5:
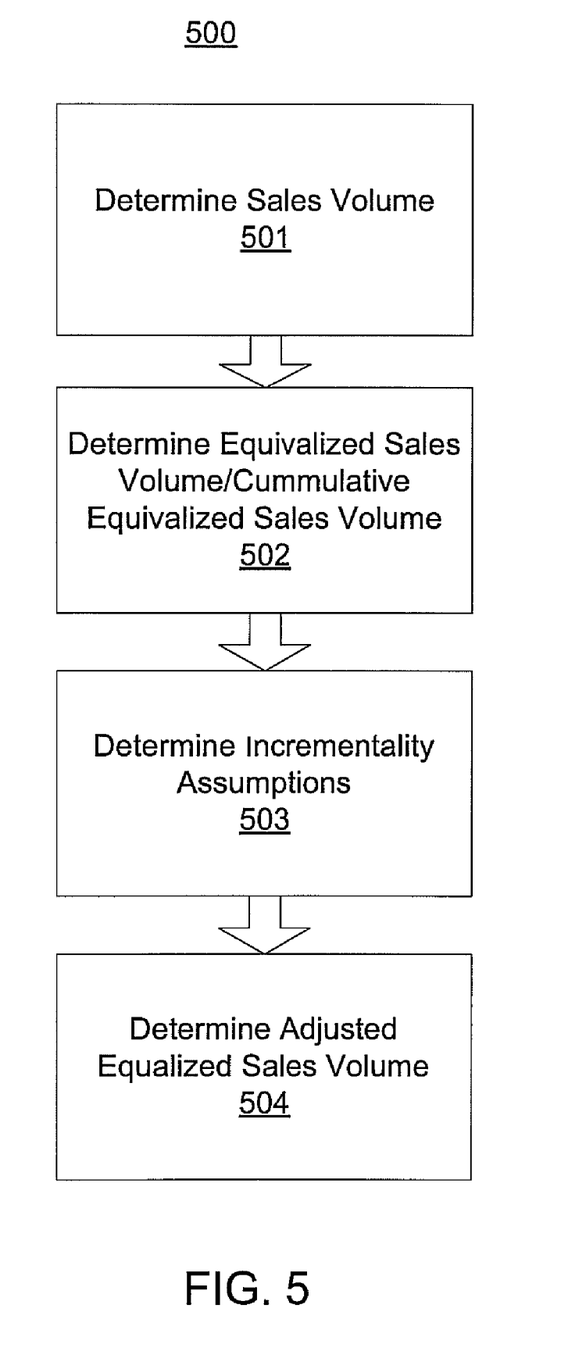
FIG. 5 illustrates a method for determining scaled performance metric values for an assortment of products, according to an embodiment.

FIG. 5 illustrates a method 500 for determining scaled sales volume values for an assortment of products. The description of FIGS. 3a-b above describes many of the steps of the method 500. The items in column M of FIG. 3b are examples of scaled sales volume values for the assortment of products 110 and are plotted as the scaled volume curve 201 in the graphical representation 111 shown in FIG. 2.

The method 500 and other methods described herein may be performed by the system 100 shown in FIG. 1 by way of example. Other systems may be used to perform the methods.

The method 500 and other methods described herein are described with respect to a performance metric being sales volume. It will be apparent to one of ordinary skill in the art the method 500 may be used with other performance metrics, examples of which are described above.

At step 501, sales volume is determined for each product in an assortment of products. An example is shown in columns B and C of FIG. 3a. The sales volumes may be actual sales volumes provided by a user and stored in the database 112. The sales volumes are performance metric values for the sale volume performance metric.

At step 502, equivalized sales volume (e.g., column D) and cumulative equivalized sales volume (e.g., column E) are determined from the sales volumes. Equivalization may include estimating a product's sales volume in a target retail store based on the product's sales volume in a source retail store. Since the target and source stores may carry different products and sales volume may be impacted differently in different stores, the equivalization provides estimations to account for the differences in the stores that may impact sales volume for a product differently.

At step 503, incrementality assumptions for scaling the equivalized sales volumes are determined. These assumptions may include scaling values for scaling the equivalized sales volumes to account for cannibalization of sales volumes from the existing target products when the source products are added to the assortment of products. The assumptions may include an estimation of the amount of sales volume that will be cannibalized from the target assortment of products as a result of adding the source assortment of products to the target assortment. Examples of the assumptions, as described above, are a 10% incrementality of addition at the tail and a 50% incrementality of addition at the head. Given these assumptions, more incrementality is given to the higher sales volume added products.

The incrementality assumptions may be input to the system 100 by a user. The incrementality assumptions may reflect the user's estimation of the incrementality of each segment. For example, highly commoditized segments may be expected to show low incrementality (say below 20%) because remaining products will recapture most of the volume from deletions. Segments which are sensitive to the presence of product attributes such as brand, size, flavor, etc., may be expected to show higher incrementality characteristics (e.g., over 50%).

At step 504, an adjusted equalized sales volume is determined from the equalized sales volume and the incrementality assumptions. The adjusted equalized sales volume for each product in the assortment of products is a product's equivalized sales volume net given the cannibalization effect on the existing target assortment of products 103. These values are shown in column L of FIG. 3b. The sales volume values in column L are determined based on multiplying the values from column G by the total sales volume that is cannibalized. This value is then subtracted from the equivalized sales volume values in column D. The cumulative equalized sale volume net (e.g., column M in FIG. 3b) may then be calculated from the values in column L. Note that the values in columns L and M are scaled sales volume values which are scaled based on the incrementality assumptions to take into consideration the cannibalization effect.

Figure 6:
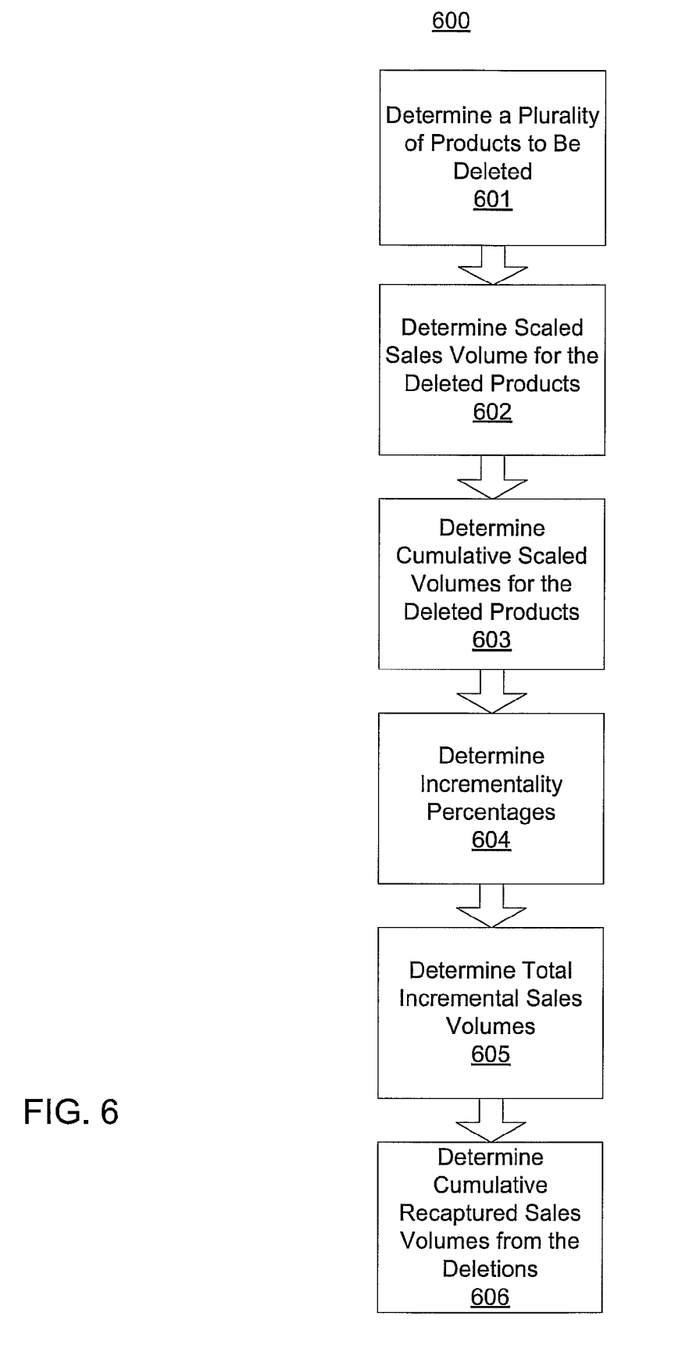
FIG. 6 illustrates a method for estimating a recaptured performance metric for deleted products, according to an embodiment.

FIG. 6 illustrates a method 600 for estimating a recaptured performance metric for the deleted products. An example of the recaptured performance metric is recaptured sales volume or cumulative recaptured sales volume. Recaptured sales volume includes sales volume for the deleted products recaptured by the non-deleted products in an assortment of products. Determining the cumulative recaptured sales volume is shown in FIG. 4 and described above.

At step 601, a plurality of products to be deleted from the product assortment are identified. The products to be deleted may be determined based on a deletion order, described in further detail below or based on other factors. A user may select the products to delete.

At step 602, the scaled sales volumes for the deleted products are determined. These values are shown in column L in FIG. 3b.

At step 603, cumulative scaled sales volumes for the deleted products are determined, such as shown in column M in FIG. 3b.

At step 604, incrementality percentages are determined for the products being deleted and are based on the share of equivalized sales volume represented by the deleted products, such as shown in column Q. The values are calculated based on the sliding scale, i.e., some of the incrementality assumptions such as 30% incremental at the tail and 90% incremental at the head.

At step 605, the total incremental sales volumes from the deletions are determined, such as shown in column R. This total incremental sales volume from the deletions is the present incrementality from the prior row multiplied by the equivalized sales volumes for the deleted products.

At step 606, the cumulative recaptured sales volumes from the deletions are determined, such as shown in column S. The cumulative recaptured sales volumes are the total deleted sales volumes from column P less the incremental portion of those sales volumes from column R.

The optimum incremental curve 202 shown in FIG. 2 shows what would happen if you delete one item at a time starting with the least impacting product on sales volume and so on until you delete the highest impacting product. In the example of the optimum incremental curve 202, product 24 is the least impacting product. Product 23 is the next least and so on until product 1. As each product from product 24 to product 1 is deleted, the curve 202 eventually goes to 0 sales volume because all products are deleted. A retailer may use the curve the 202 to determine a percentage of products that can be deleted without significantly impacting sales volume of the total assortment. A retailer may identify a threshold of risk in terms of percentage of sales volume reduction. e.g., 1%. The retailer may use the curve 202 to estimate the percentage of products that can be deleted but still maintain 99% of sales volume.

Determining the order of the products from least impacting to most impacting is described as determining an optimum product deletion order. The method for determining the optimum product deletion order is described with respect to FIG. 7.

Figure 7:
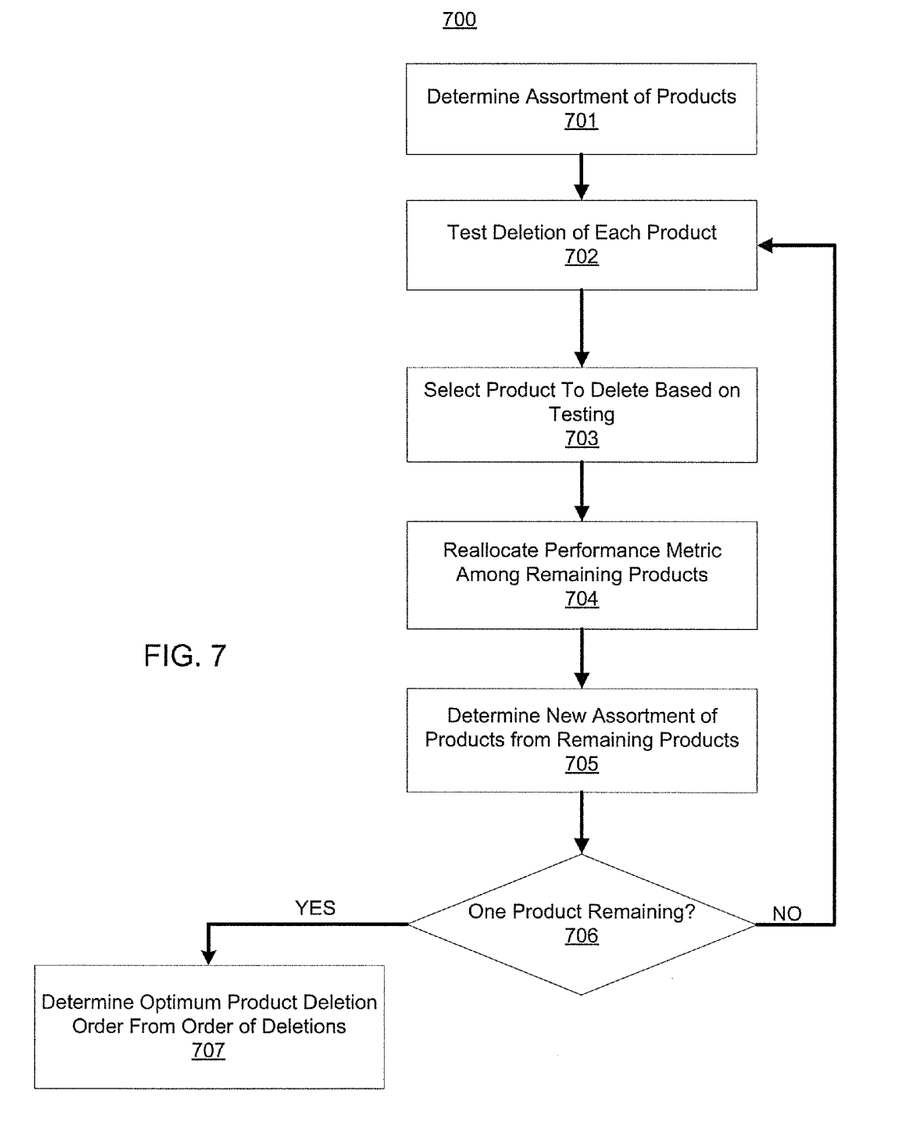
FIG. 7 illustrates a method for calculating an optimum product deletion order, according to an embodiment.

FIG. 7 illustrates a method 700 for calculating the optimum product deletion order. The deletion order may be used to select the products to delete from an assortment of products. These may be the products identified at step 601 of the method 600.

At step 701, an assortment of products is determined. This may include the assortment of products including the target assortment 103 and the source assortment 104.

At step 702, deletion of each product in the assortment of products is tested. Testing may include evaluating a net change in a performance metric. The net change may be the difference between a total of the performance metric for the assortment of products without any deletions minus a total of the performance metric for the assortment of products with a selected product deleted. The net change may be determined for each product in the assortment of products. The performance metric is a combination of at least two performance metrics. An example may include combining profit and sales volume.

At step 703, a product to be deleted is selected from the assortment of products based on the testing. The first product to be selected for deletion may be the product that has the lowest net impact on the performance metric.

At step 704, a performance metric for the deleted product is reallocated to each remaining product, for example, using the method 600. For example, the sales volume for the deleted product is reallocated to the remaining products, and then the sales volume for each of the remaining products is determined.

At step 705, from this new assortment of products (i.e., starting from the assortment of products with the selected product deleted and the sales volume of the deleted product reallocated to the remaining products), each product in the new assortment is again be tested for deletion, and a second product is selected for deletion in the same manner as described in steps 702-704. At step 706, these steps are repeated until the last remaining product is determined, which is assigned the lowest priority (i.e., the last product to be selected for deletion to optimize the performance metric or the performance metric). At step 707, the optimum product deletion order is determined from the order of deletions, e.g., the highest priority product is the first product selected at the first iteration of step 703. This is the number 1 delete priority and in this example is product 24.

If fixed costs are used as part of the performance metric, then as an item is deleted, all the remaining products are retested at step 702. Fixed costs may go down as products are deleted. For example, if a fixed cost is shelf space, when you delete a product, the cost for shelf space goes down. Then, the profitability of the remaining products goes up because fixed costs go down.

5. Computer System

Figure 8:
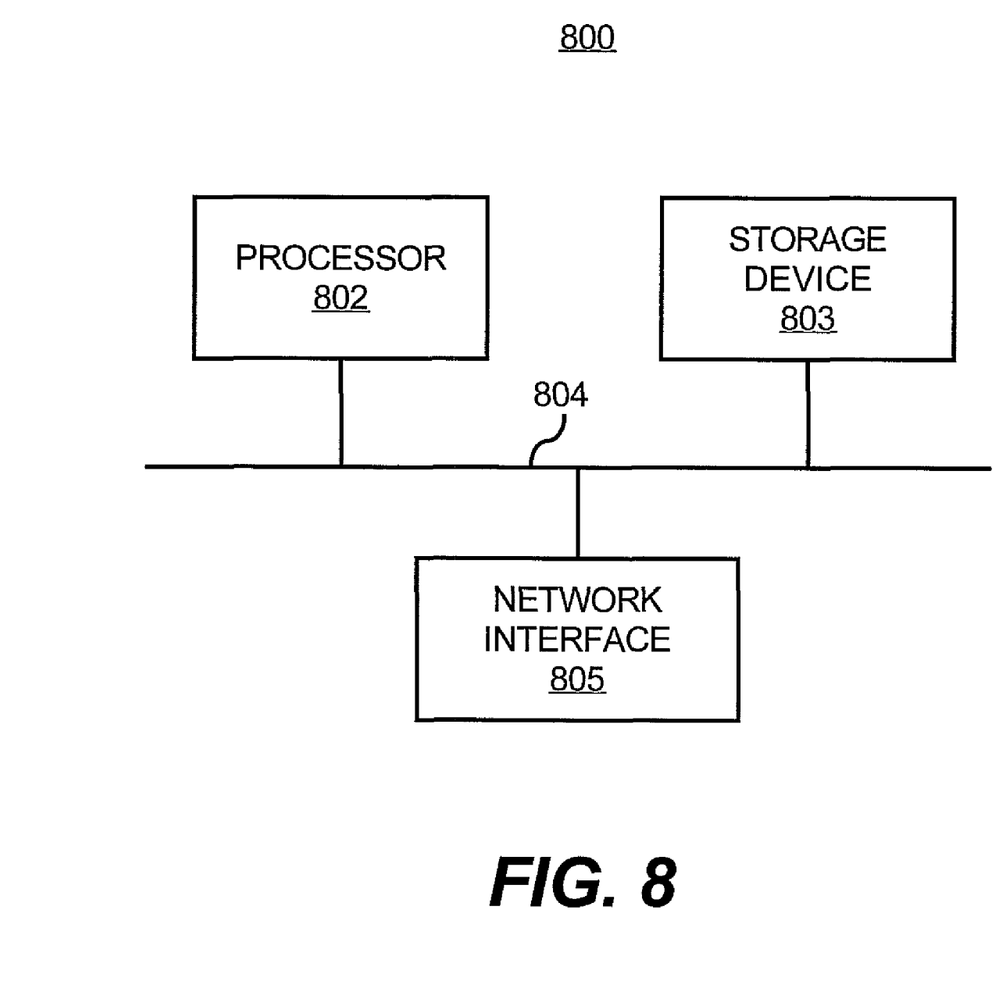
FIG. 8 illustrates a computer system, according to an embodiment.

FIG. 8 shows a computer system 800 that may be used as a hardware platform for the system 100. The computer system 800 may be used as a platform for executing one or more of the steps, methods, modules and functions described herein that may be embodied as machine readable instructions in one or more computer programs stored on one or more computer readable mediums. The computer readable mediums may be non-transitory, such as storage devices including hardware. One or more processors may be used to execute the machine readable instructions stored on the one or more computer readable mediums.

The computer system 800 includes a processor 802 or processing circuitry that may implement or execute software instructions performing some or all of the methods, modules, functions and other steps described herein. Commands and data from the processor 802 are communicated over a communication bus 804. The computer system 800 also includes a computer readable storage device 803, such as random access memory (RAM), where the software and data for processor 802 may reside during runtime. The storage device 803 may also include non-volatile data storage. The computer system 800 may include a network interface 805 for connecting to a network. It will be apparent to one of ordinary skill in the art that other known electronic components may be added or substituted in the computer system 800.

The embodiments described herein relate to providing a computer-aided system and methods for product assortment planning. In particular, performance metric values are calculated, stored and processed. The processing may be performed to determine an optimum product assortment to carry at a target store to maximize the performance metric. Additionally, the system provides an adequate display for displaying curves and deletion orders that are used to determine the optimum assortment for products for the target store. This provides the user with a quick and clear overview of products that may be deleted with minimal impact and scaling parameters for determining the impacts of deletions. Hence, man-machine interaction is improved because a user is relieved from the mental task of guessing the most optimal product assortment and further the user is aided by the system providing a more robust and accurate determination of impact of deletions and optimal product assortment.

While the embodiments have been described with reference to examples, those skilled in the art will be able to make various modifications to the described embodiments without departing from the scope of the claimed embodiments.

What is claimed is:

1. A product assortment planning system operable to determine scaled performance metric values for an assortment of products, the system comprising:
   a computer system including a processor, the computer system further comprising:
   a data store storing performance metric values for an assortment of products including a target assortment of products and a source assortment of products;
      a retrieval unit executed by the processor to retrieve the performance metric values for each product in the assortment of products;
      an equivalization unit executed by the processor to equivalize the performance metric values for the source assortment of products;
      a scaling unit executed by the processor, the scaling unit to
         determine incrementality assumptions, wherein the incrementality assumptions are an estimation of an amount of cannibalization that occurs for the target assortment of products as a result of combining the source assortment of products with the target assortment of products, and
         calculate scaled performance metric values for each product in the assortment of products based on the equivalized performance metric values and the incrementality assumptions; and
   an optimization unit executed by the processor to calculate an optimum product deletion order for the combined assortment of products, wherein to calculate an optimum product deletion order includes:
   testing deletion of each identified product to determine a net change in the performance metric for each of the products, and selecting a first product to delete based on the net change;
   estimating a recaptured performance metric for the deleted product based on at least one of the scaled performance metric values;
   reallocating the recaptured performance metric for the deleted product to the remaining products, and calculating the performance metric for the remaining products based on the reallocated recaptured performance metric;

determining a new assortment of products comprised of the remaining products and the calculated performance metric for the remaining products, testing each product in the new assortment of products for deletion, selecting a next product for deletion based on the testing; and performing the determining a new assortment of products, the testing and the selecting until one product is remaining, wherein an order of deletion of each of the products represents the optimum product deletion order.

2. The system of claim 1, wherein the optimization unit estimating the recaptured performance metric comprises determining the calculated scaled performance metric values for the deleted product, determining incrementalities for the deleted product, and estimating the recaptured performance metric for the deleted products product based on the calculated scaled performance metric values for the deleted product and the incrementalities for the deleted product.

3. A method for product assortment planning, the method comprising:

receiving a target assortment of products and a source assortment of products;

determining performance metric values for each product in the target assortment of products and the source assortment of products;

equivalizing the performance metric values;

determining incrementality assumptions, wherein the incrementality assumptions are an estimation of an amount of cannibalization that occurs for the target assortment of products as a result of combining the source assortment of products with the target assortment of products;

calculating, by a computer, scaled performance metric values for each product in the target assortment of products and the source assortment of products based on the equivalized performance metric values and the incrementality assumptions, and calculating an optimum product deletion order for the combined assortment of products, wherein calculating an optimum product deletion order includes:

identifying products to be deleted from the combined assortment of products;

testing deletion of each product to determine a net change in the performance metric for each of the products, and selecting a first product to delete based on the net change;

estimating a recaptured performance metric for the deleted product based on at least one of the scaled performance metric values;

reallocating the recaptured performance metric for the deleted product to the remaining products, and calculating the performance metric for the remaining products based on the reallocated recaptured performance metric;

determining a new assortment of products comprised of the remaining products and the calculated performance metrics for the remaining products, testing each product in the new assortment of products for deletion, selecting a next product for deletion based on the testing; and performing the determining a new assortment of products, the testing and the selecting until one product is remaining, wherein an order of deletion of each of the products represents the optimum product deletion order.

4. The method of claim 3, wherein estimating a recaptured performance metric for the deleted product comprises:

determining the calculated scaled performance metric values for the deleted product;

determining incrementalities for the deleted product; and estimating the recaptured performance metric for the deleted product based on the calculated scaled performance metric values for the deleted product and the incrementalities for the deleted product.

5. The method of claim 3, wherein the performance metric is a combination of at least two performance metrics.

6. A non-transitory computer readable medium storing machine readable instructions that when executed by a computer system performs a method for product assortment planning, the method comprising:

receiving a target assortment of products and a source assortment of products;

determining performance metric values for each product in the target assortment of products and the source assortment of products;

equivalizing the performance metric values;

determining incrementality assumptions, wherein the incrementality assumptions are an estimation of an amount of cannibalization that occurs for the target assortment of products as a result of combining the source assortment of products with the target assortment of products;

calculating, by a computer, scaled performance metric values for each product in the target assortment of products and the source assortment of products based on the equivalized performance metric values and the incrementality assumptions; and calculating an optimum product deletion order for the combined assortment of products, wherein calculating an optimum product deletion order includes:

identifying products to be deleted from the combined assortment of products;

testing deletion of each product to determine a net change in the performance metric for each of the products, and selecting a first product to delete based on the net change;

estimating a recaptured performance metric for the deleted product based on at least one of the scaled performance metric values;

reallocating the recaptured performance metric for the deleted product to the remaining products, and calculating the performance metric for the remaining products based on the reallocated recaptured performance metric;

determining a new assortment of products comprised of the remaining products and the calculated performance metrics for the remaining products, testing each product in the new assortment of products for deletion; selecting a next product for deletion based on the testing; and performing the determining a new assortment of products, testing and selecting until one product is remaining, wherein an order of deletion of each of the products represents the optimum product deletion order.

7. The computer readable medium of claim 6, wherein estimating a recaptured performance metric for the deleted product comprises:

determining the calculated scaled performance metric values for the deleted product products;

determining incrementalities for the deleted product; and estimating the recaptured performance metric for the deleted product based on the calculated scaled performance metric values for the deleted product and the incrementalities for the deleted product.

* * * * *